H. M. PLAISTED.

ROTARY HAMMER.

APPLICATION FILED DEC. 13, 1919.

Reissued May 25, 1920. 14,865.

INVENTOR.

H. M. Plaisted.

BY

F. R. Fairbairn

ATTORNEY.

UNITED STATES PATENT OFFICE.

HAROLD M. PLAISTED, OF ST. LOUIS, MISSOURI, ASSIGNOR TO WILLIAMS PATENT CRUSHER AND PULVERIZER CO., OF ST. LOUIS, MISSOURI, A CORPORATION OF MISSOURI.

ROTARY HAMMER.

14,865. Specification of Reissued Letters Patent. Reissued May 25, 1920.

Original No. 1,281,829, dated October 15, 1918, Serial No. 237,907, filed June 3, 1918. Application for reissue filed December 13, 1919. Serial No. 344,674.

*To all whom it may concern:*

Be it known that I, HAROLD M. PLAISTED, a citizen of the United States, residing at the city of St. Louis, State of Missouri, have invented certain new and useful Improvements in Rotary Hammers, of which the following is a specification.

This invention relates to certain new and useful improvements in rotary hammers for grinders, pulverizers, and like reducing machines, the peculiarities of which will be hereinafter described and claimed.

The main object of my invention is the provision of a rotary hammer of such pivotal mounting and arrangement of adjacent parts, that the operative edges will have effective cage clearance, and will clear adjacent hammers.

Figure 1:
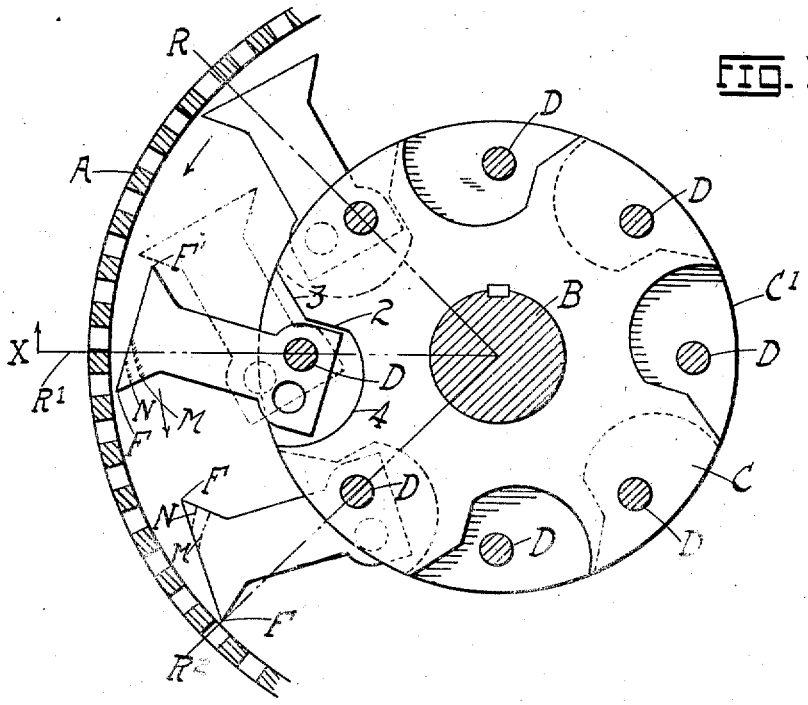
Figure 2:
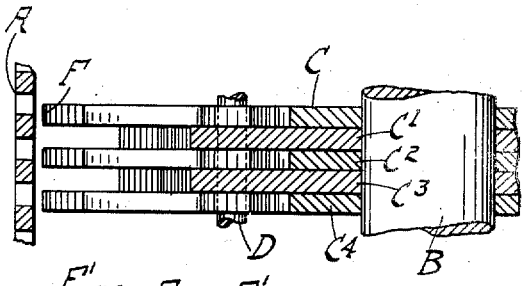
Figure 3:
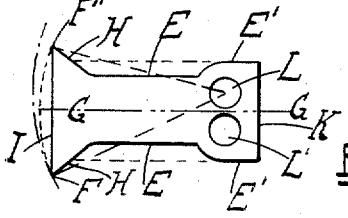

In the accompanying drawings on which like reference letters indicate corresponding parts, Figure 1 represents a partial sectional elevation of any suitable reducing machine, embodying my invention;

Fig. 2, a horizontal sectional view on the line X of Fig. 1, looking upward;

Fig. 3, a detail view of my hammer; and

Figure 4:
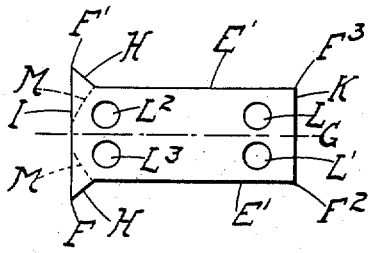

Fig. 4 another form of my hammer.

The general style of grinders to which my improvements are especially applicable, is shown in Patent No. 1,266,894, dated May 21, 1918, to which reference is made for illustration of detail construction not shown herewith.

The letter A designates an arcuate cage, concentric with a shaft B on which are keyed disks C—$C^1$—$C^2$—$C^3$, etc., that carry hammer rods D on which are pivoted hammers that coöperate with said cage in grinding the material supplied thereto. These hammers each consist preferably of flat bar steel of suitable thickness, the parallel sides E of which constitute a shank. At the outer end of said shank are located operative or cutting edges F—F′ extending across the thickness of the bar and equally distant from a longitudinal central line G, and preferably formed at the extremities of lateral angular projections formed by the outwardly diverging sides and a square or other shaped outer end I. These symmetrical operative edges may be otherwise formed. The opposite or inner end of said shank is shown in Figs. 1 and 3, as being widened to sides E′ that meet a square inner end K at right angles as shown, and join the sides E by an arc about the center of a hole L that is located substantially an equal distance from the inner end K and from the nearer side E′, but is also eccentric to, or at one side of the central line G. This hole is for pivotally mounting the hammer on the respective rod D, and the operative edge F on the opposite side of the line G is farther from the center of the hole L than is the edge F′ that is on the same side of the axis as the center of the hole L. When the hammer is mounted on its rod D, and the shaft is rotated in the direction of the arrow, the center of gravity of the hammer will be normally located on a radial line from the shaft B and the hammer will assume substantially the position shown at R and $R^1$. In this normal position of rotation, the forward edge F is in front of the radial line through the center of gravity of the hammer. Under the resistance of the material being ground the forward edge will approach closest to the cage when it falls back to this line, as shown at $R^2$. The rear edge F′ however, on account of being nearer to the center L, and on the opposite side of the line G, will be approximately four times farther from the cage than F, in the position of a hammer shown at R and $R^1$; and this proportion increases when the forward edge of the hammer is forced back under the resistance of the material being ground. This comparative location of the front and rear edges brings the forward edge in its coöperative position, close to the cage, while it withdraws the rear edge more and more from the material being ground and away from the cage, thus avoiding dulling the rear edge, and also providing clearance for the forward edge.

At $R^1$ is indicated at M and N, the usual and maximum wear respectively, before reversing the hammers on the hammer rods so as to bring the edge F′ to the front as the working edge. This is done by means of a corresponding hole L′, the center of which (see Fig. 3) is located on the opposite side of the line G, diagonally from the center of the hole L, and bears a reverse relation to the edges F and F′ that is borne by the center of the hole L; that is, the edge F′ is a farther distance from L′ than is the edge F; the distance between F and L is substantially the same as between F′ and L′, and the distance F′ L is substantially the same as F L′. In other words, the hammer pivot holes, the cutting or operative edges, and the side edges of the shank, are all symmetrically located with regard to the central longitudinal line G through the shank. When the edge F is worn back as mentioned above, and the hammer is reversed so as to pivot on the center L′, the edge F′ will approximate the position indicated at $R^2$ and will practically renew the effective or cutting action of the hammers for a further period.

Fig. 4 shows another form of my hammer, in which the hub width E′—E′ of Fig. 3 is continued the length of the shank. This avoids forge work at the inner end. Near the outer end are provided corresponding holes $L^2$ and $L^3$—the centers of which bear the same relation to the corner edges $F^2$ and $F^3$ respectively, as L and L′ bear to the other operative edges F and F′. When the outer edges F and F′ are successively worn down as indicated at M, the hammer can be remounted successively to pivot on the centers of the holes $L^2$ and $L^3$; the corner edges $F^2$ and $F^3$ will thus become successively the operative edge, and further effective use of said hammer is provided.

The operative edges F—F′ are shown in Figs. 3 and 4 as projecting laterally beyond the side edges E′—E′ of the shank, and are equi-distant from the axis G.

The length of the operative or cutting edge may be the width of the hammer, or may be more or less, according to the shape best suited to reduce the material fed to the hammers.

In order to prevent dulling the corners of the operative edges by contact with adjacent hammers, a limit stop for the oscillation of the hammer is provided in both directions, preferably by means of a bearing edge 2 and a bearing edge 3 formed by cut-out portions of each disk plate at alternate hammer rods, thus forming a pocket in connection with a clearance arc 4. When the hammer is in the position shown by full lines at R and R′, the side edge of the hub width E′ is substantially in contact with the bearing edge 2; at $R^2$, the hammer has receded slightly under resistance of the material; the dotted position at $R^1$ indicates the side edge E of the hammer being limited in its backward swing by the bearing edge 3.

The same side edge of the hammer is in contact with said bearing edges or stops, but stop edge 2 acts on side edge E′ inside the pivot center L, while the stop edge 3 acts on side edge E outside of said pivot, measured radially. The same is true when the hammer shown in Fig. 4, is substituted for that of Fig. 3,—only the stop edge 3 is cut back more to correspond to the hub width of said shank. Being on the same side of the hammer, the stop edges are more accurately located with respect to the actual pivot center or hammer rod.

It will be observed that in the construction shown in Fig. 4, the hammer possesses four cutting or disintegrating points or corners; that the pivotal points of mounting being located to one side of the longitudinal axis, at each end of the hammer enable it to be used efficiently in four different positions; that the off-centering of the pivotal points, when the hammers are held outwardly by centrifugal force, causes said hammers to occupy tangential positions, in which the outer forward reducing edge, corner, or point, is farther away from the center of revolution (shaft B) than the rearmost outer edge of the hammer, and that to effect the above it is necessary to pivotally mount the hammer in the rearmost hole, considering the direction of rotation—*i. e.*—arrange the pivot bolt D through the rearmost hole in the inner end of the hammer, as shown in Fig. 1—the direction of rotation of the hammers being indicated by the arrows.

I claim:

1. A rotary hammer comprising a flat bar shank provided with an operative edge at one end on each side of the central line of the shank, and having pivot holes located on opposite sides of said line near the other end.

2. A rotary hammer comprising a flat bar shank provided with outwardly diverging lateral projections at one end of said shank, having a pair of holes near the other end adapted for pivotal mounting.

3. A rotary hammer comprising a flat bar shank provided at each end on opposite sides thereof with operative edges substantially equi-distant from the central line of the shank, and also with a pair of holes near each end of the shank substantially equi-distant from the central line, and the center of each hole substantially equi-distant from the operative edge at the opposite end of the shank respectively, measured diagonally across the longitudinal central line of the shank.

4. A rotary hammer comprising a flat bar shank, provided at one end with operative edges, equi-distant from the central axis of the shank, and at the other end with another pair of operative edges separated laterally a farther distance than the first pair, said shank having a pair of holes near each end thereof, equi-distant from said axis for pivotal mounting, and each hole being equi-distant from the farthest operative edge respectively.

5. The combination with a shaft, a suitable casing, oscillatable rotary pivoted hammers having sharp edges at front and rear faces and having contact portions on one face of the shank near the pivot end, of a set of disks substantially as thick as the hammers having pockets and alternately arranged on said shaft with regard to said pockets, each of said pockets having two bearing faces located near and at the same side of said pivot, but radially inside and outside the pivot respectively, so as to effect contact alternately with said contacts on the adjacent side of the hammer, and limit the oscillation of said hammers in both directions and thereby prevent overlapping and dulling of adjacent hammers.

6. In combination with a cage, a reversible hammer having oppositely disposed cutting edges on one of its ends and pivotal means adapted to be applied on each side of the longitudinal axis of said hammer and at the opposite end thereof from said cutting edges, whereby the forward edge will be nearest the cage when said hammer is in operation.

7. A rotary hammer provided with operative edges at one end and provided at the other end with openings on opposite sides of the longitudinal central line thereof.

8. A rotary hammer having at on end oppositely disposed cutting edges and provided at the other end with openings on opposite sides of the longitudinal central line thereof.

In testimony whereof, I hereunto affix my signature, this 1st day of December, 1919.

HAROLD M. PLAISTED.